US009262107B2

(12) United States Patent
Osajima

(10) Patent No.: US 9,262,107 B2
(45) Date of Patent: Feb. 16, 2016

(54) APPARATUS, SYSTEM, NON-TRANSITORY COMPUTER READABLE MEDIUM, AND METHOD THAT PERFORM BATCH IMAGE FORMING

(71) Applicant: FUJI XEROX CO., LTD., Minato-ku, Tokyo (JP)

(72) Inventor: Kentaro Osajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/285,916

(22) Filed: May 23, 2014

(65) Prior Publication Data
US 2015/0043028 A1    Feb. 12, 2015

(30) Foreign Application Priority Data
Aug. 9, 2013    (JP) ................. 2013-167135

(51) Int. Cl.
*G06F 3/12* (2006.01)
*H04N 1/00* (2006.01)
*G06K 15/00* (2006.01)

(52) U.S. Cl.
CPC ............ *G06F 3/1253* (2013.01); *G06F 3/1204* (2013.01); *G06F 3/126* (2013.01); *G06F 3/1258* (2013.01); *G06F 3/1271* (2013.01); *H04N 1/0035* (2013.01)

(58) Field of Classification Search
CPC ............ H04N 1/0089; H04N 1/00413; H04N 1/00427; H04N 1/00474; H04N 1/00482; H04N 1/00503; H04N 1/00832; H04N 1/0097; H04N 1/4413; H04N 1/4433
USPC ........................ 358/1.1, 1.13, 1.14, 1.15, 1.16
See application file for complete search history.

(56) References Cited

U.S. PATENT DOCUMENTS

2006/0152742 A1* 7/2006 Kawabata .................. 358/1.1
2006/0187483 A1   8/2006 Baba

FOREIGN PATENT DOCUMENTS

JP    2006-260544 A    9/2006

* cited by examiner

*Primary Examiner* — Gabriel Garcia
(74) *Attorney, Agent, or Firm* — Sughrue Mion, PLLC

(57) ABSTRACT

Provided is an image forming apparatus including a display section that displays a first operating portion through which a first operation instruction of an operator is input and a second operating portion through which a second operation instruction different from the first operation instruction is input, on a display screen in image formation and an image forming section that performs the image formation, when the first operation instruction of the operator is input through the first operating portion displayed by the display section, onto a recording medium, and displays, when the second operation instruction of the operator is input through the second operating portion displayed by the display section, the image data stored in the storage unit as a list and performs the image formation onto the recording medium for image data selected from the list by the operator.

9 Claims, 12 Drawing Sheets

PERSONAL
BATCH PRINTING

PERSONAL PRINTING
(LIST DISPLAY)

APPARATUS, SYSTEM, NON-TRANSITORY COMPUTER READABLE MEDIUM, AND METHOD THAT PERFORM BATCH IMAGE FORMING

CROSS-REFERENCE TO RELATED APPLICATIONS

This application is based on and claims priority under 35 USC 119 from Japanese Patent Application No. 2013-167135 filed Aug. 9, 2013.

BACKGROUND

Technical Field

The present invention relates to an image forming apparatus, an image forming system, a non-transitory computer readable recording medium, and an image forming method.

SUMMARY

According to an aspect of the invention, there is provided an image forming apparatus including:

a display section that displays a first operating portion through which a first operation instruction of an operator is input and a second operating portion through which a second operation instruction different from the first operation instruction is input, on a display screen in image formation; and an image forming section that performs the image formation, when the first operation instruction of the operator is input through the first operating portion displayed by the display section, onto a recording medium for plural pieces of image data in which the image formation has never been executed among image data stored in a storage unit provided in an own apparatus or an external device different from the own apparatus, and displays, when the second operation instruction of the operator is input through the second operating portion displayed by the display section, the image data stored in the storage unit as a list and performs the image formation onto the recording medium for image data selected from the list by the operator.

BRIEF DESCRIPTION OF THE DRAWINGS

Exemplary embodiments of the present invention will be described in detail based on the following figures, wherein.

Figure 6:
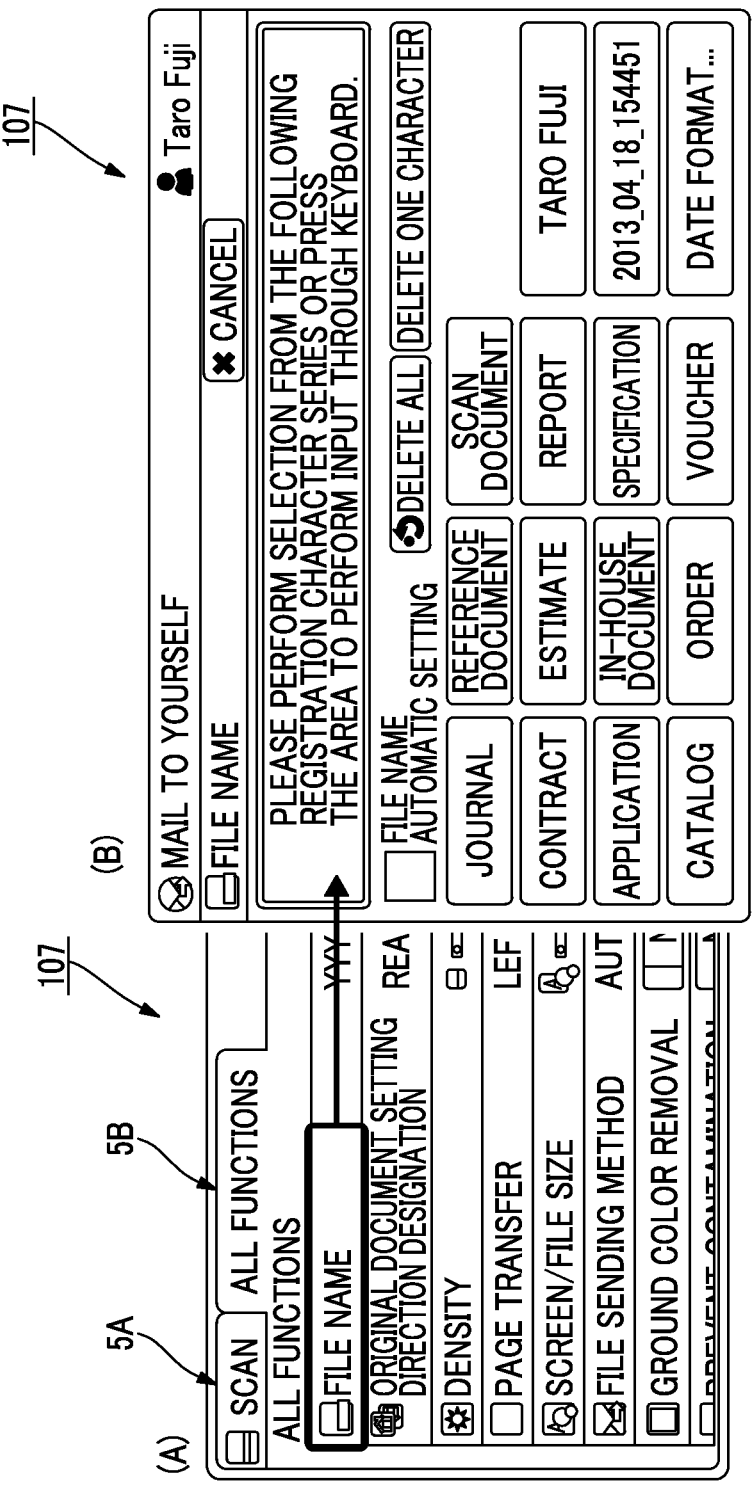
Figure 7:
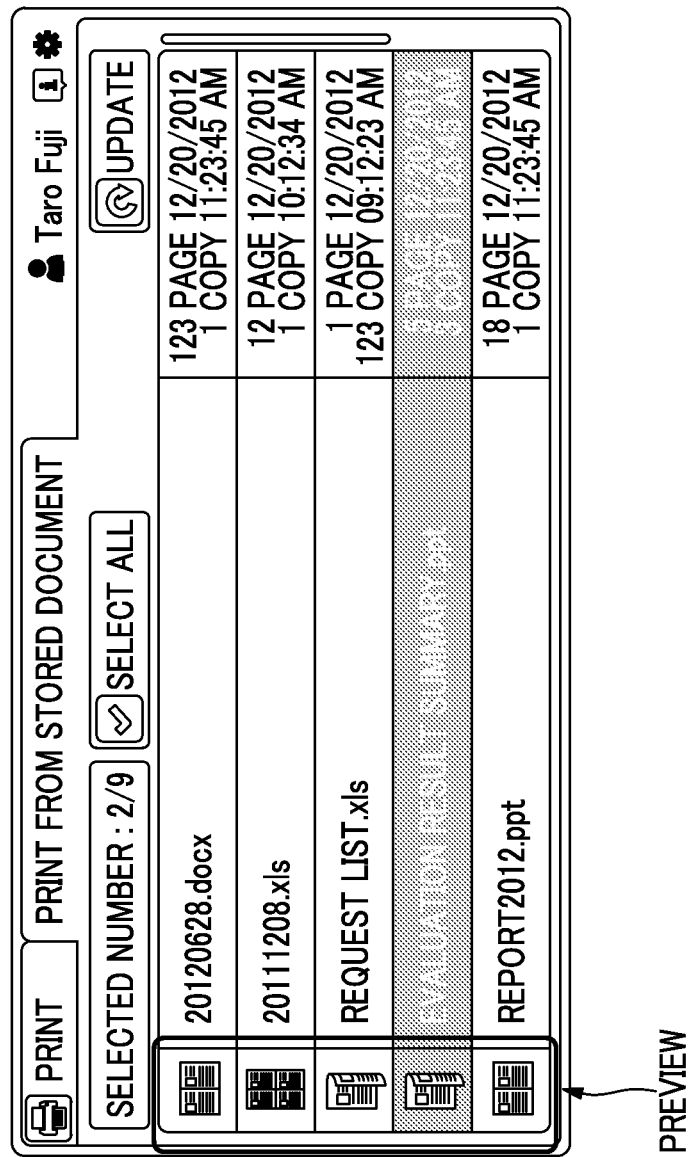
Figure 8:
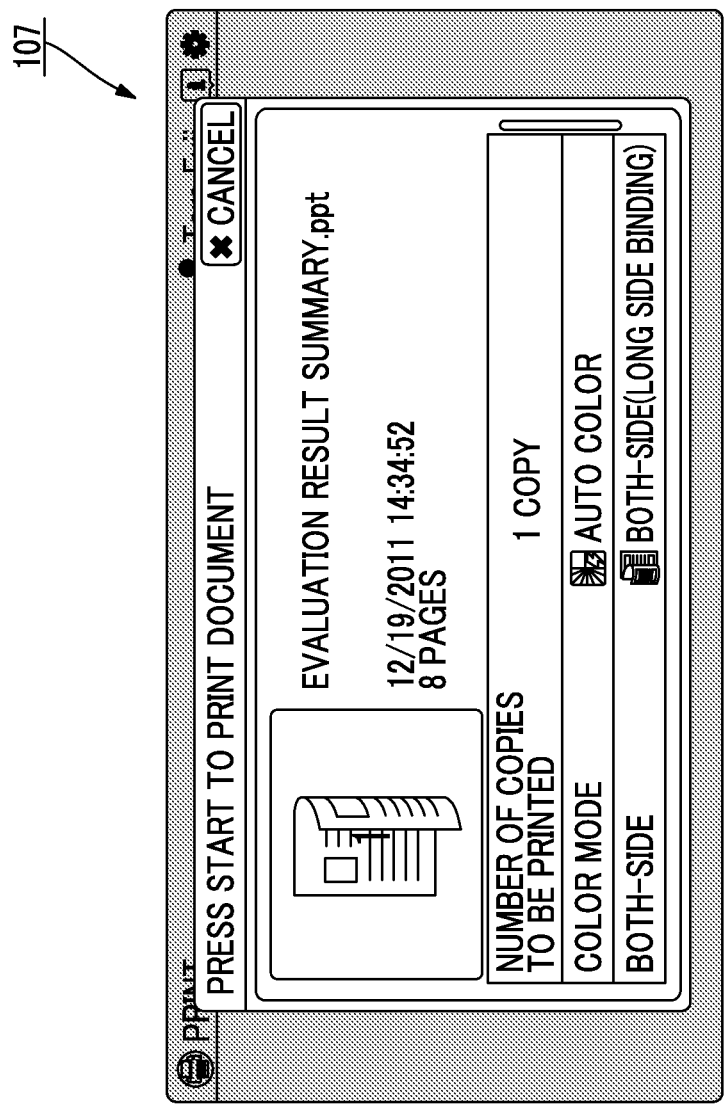
Figure 9:
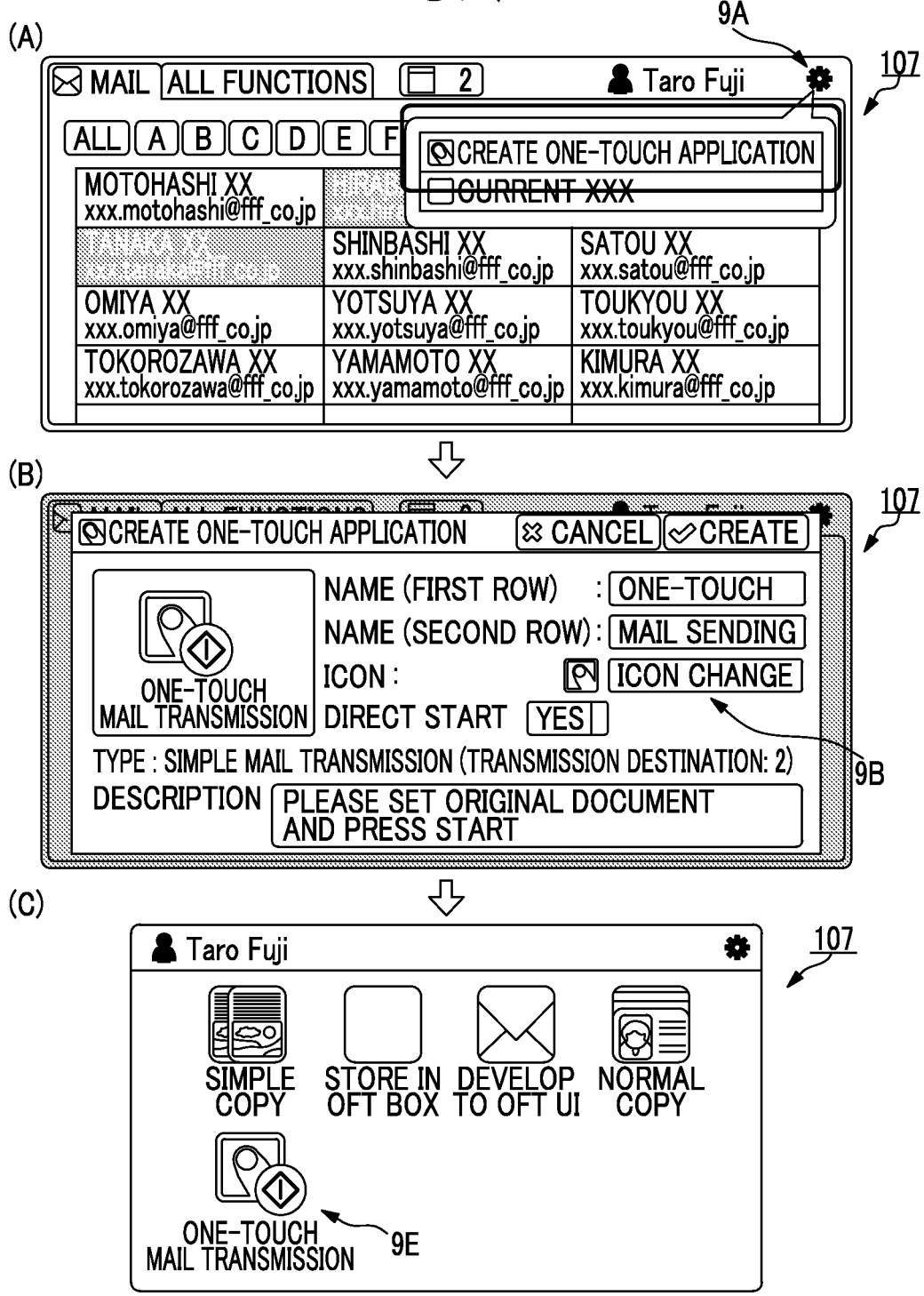
Figure 10:
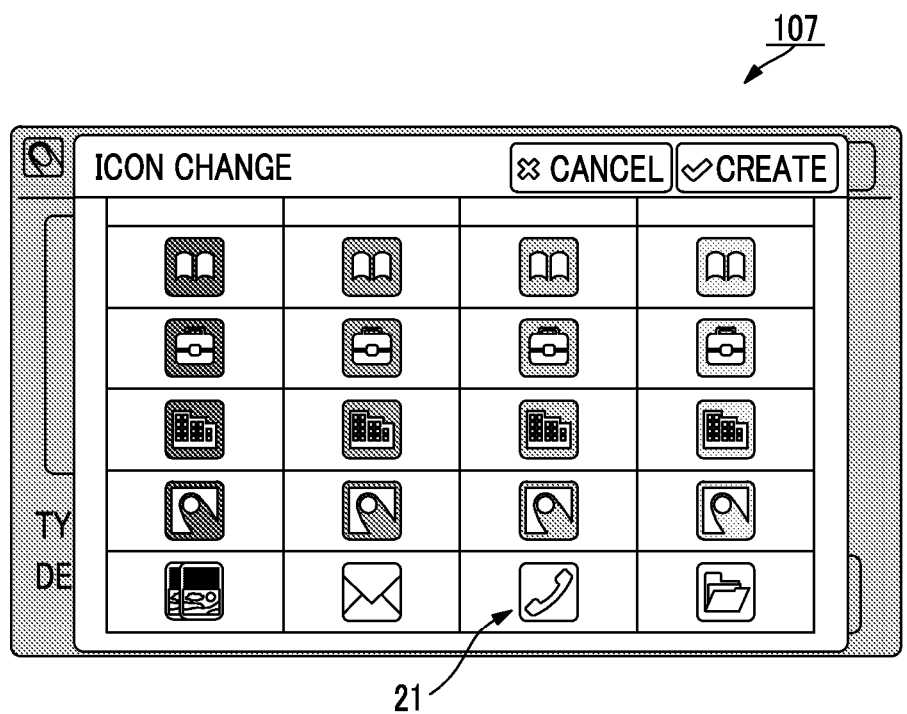
Figure 11A:
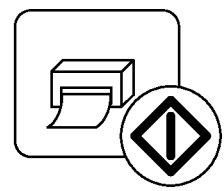
Figure 11B:
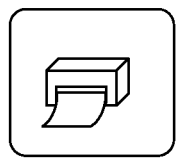
Figure 12:
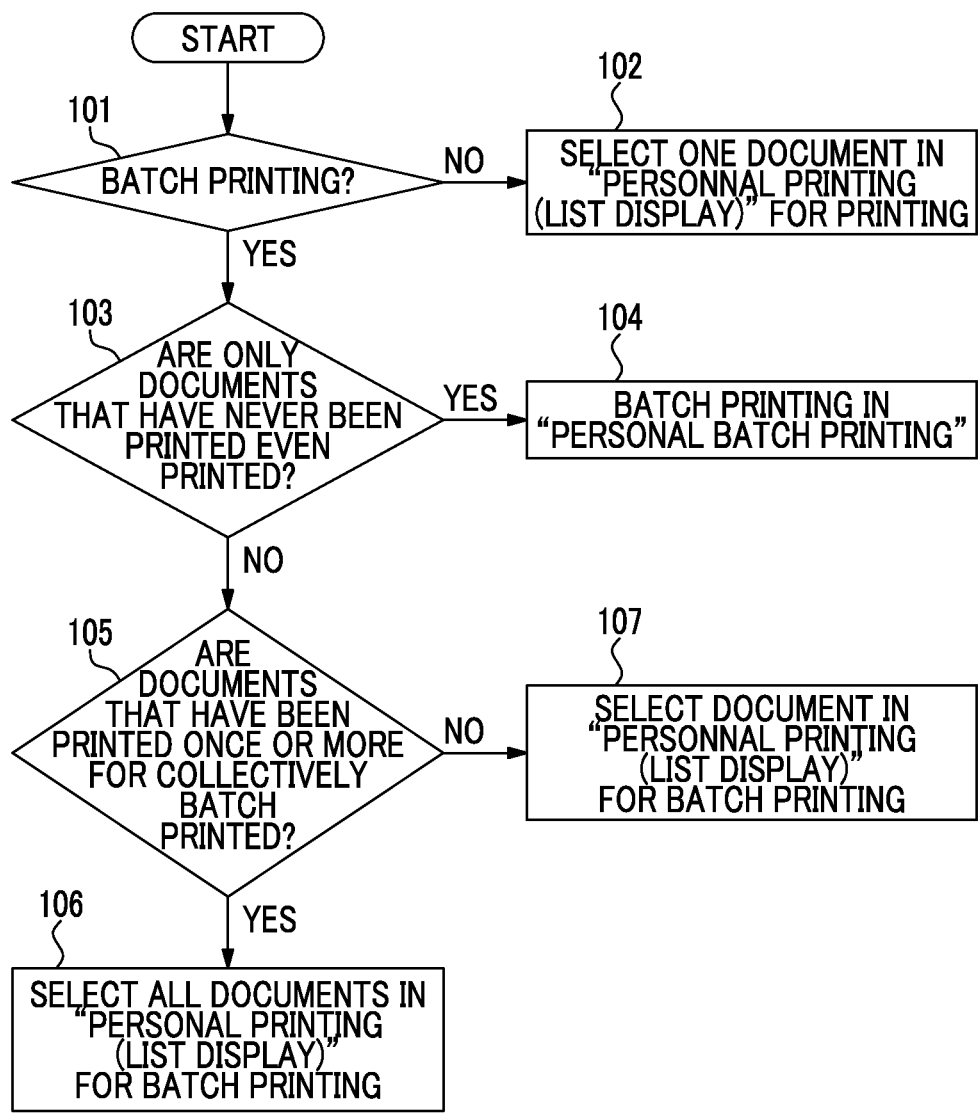

(A) and (B) of FIG. 6 are diagrams illustrating display screens when a second tab is selected;

FIG. 7 is a diagram illustrating a display screen after "personal printing" is selected;

FIG. 8 is a diagram illustrating a display screen after a file is selected;

(A) to (C) of FIG. 9 are diagrams illustrating display screens when a user creates one-touch selection buttons;

FIG. 10 is a diagram illustrating a list of the one-touch selection buttons;

FIGS. 11A and 11B are diagrams illustrating selection buttons used in the personal printing; and FIG. 12 is a flowchart illustrating an example of a printing procedure due to the personal printing.

DETAILED DESCRIPTION

Hereinafter, exemplary embodiments of the invention will be described with reference to the accompanying drawings.

Figure 1:
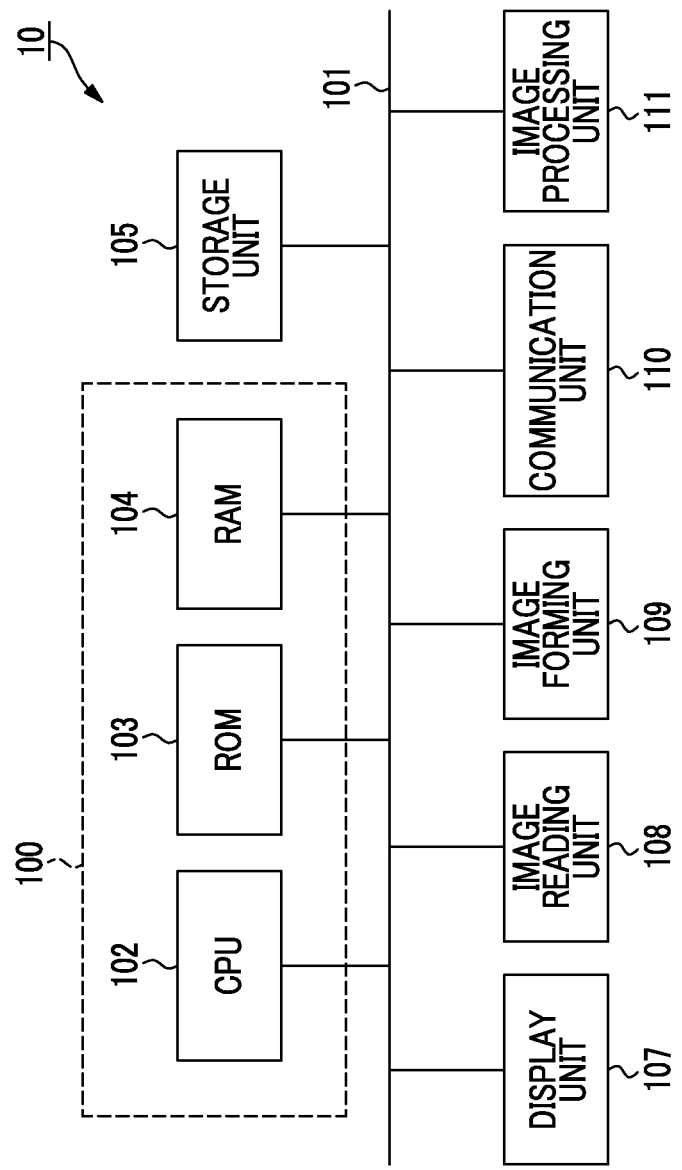
FIG. 1 is a block diagram illustrating a hardware configuration of an image forming apparatus according to an exemplary embodiment of the invention.

FIG. 1 is a block diagram illustrating a hardware configuration of an image forming apparatus 10 according to an exemplary embodiment of the invention. The image forming apparatus 10 of the exemplary embodiment includes a control unit 100, a storage unit 105, a display unit 107, an image reading unit 108, an image forming unit 109, a communication unit 110, and an image processing unit 111. The respective functional units are connected to a bus 101 to perform data exchange through the bus 101.

The control unit 100 controls the respective functional units provided in the image forming apparatus 10. Here, the control unit 100 includes a central processing unit (CPU) 102, a read only memory (ROM) 103, and a random access memory (RAM) 104.

The ROM 103 stores a control program executed by the CPU 102. The CPU 102 reads the control program stored in the ROM 103, and executes the control program using the RAM 104 as an operating area. If the control program is executed by the CPU 102, the respective functional units of the image forming apparatus 10 are controlled. Thus, for example, a predetermined display is performed in the display unit 107, and image formation onto a sheet is performed. Further, reading of an original document set in the image reading unit 108, or the like is performed.

The program executed by the CPU 102 may be provided in a state where the program is stored in a computer readable recording medium such as a magnetic recording medium (magnetic tape, magnetic disk or the like), an optical recording medium (optical disc or the like), a magneto-optical recording medium or a semiconductor memory. Further, the program may be downloaded to the image forming apparatus 10 using a communication unit such as the internet.

The display unit 107 is formed by a liquid crystal touch panel display, for example, and displays data relating to the image forming apparatus 10, for example, under the control of the control unit 100. Further, the display unit 107 displays a display screen for receiving an operation from a user, and receives the operation from the user through the display screen.

The image reading unit 108 includes an image reader (scanner) that reads a document to generate image data indicating an image of the document, and outputs the generated image data to the image processing unit 111.

The image forming unit 109 has an image forming mechanism that forms a toner image based on the image data, for example, on a sheet that is a recording medium by an electrophotographic technique or the like.

The communication unit 110 is connected to a communication line (not shown), and functions as a communication interface that performs communication with a different device connected to the communication line.

The image processing unit 111 performs image processing such as color correction, gradation correction and the like for the input image data, and generates image data subjected to the image processing to output the image data to the image forming unit 109.

The storage unit 105 includes a memory such as a hard disk drive, and for example, stores data received through the communication unit 110 or data generated in the image forming apparatus 10.

Figure 2:
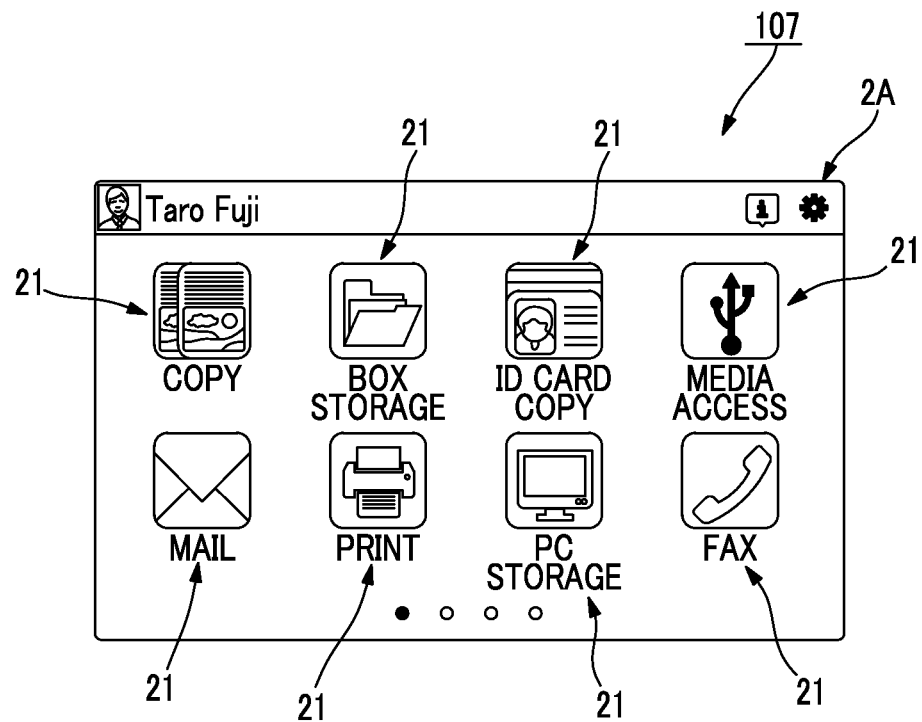
FIG. 2 is a diagram illustrating a display example in a display unit.

FIG. 2 is a diagram illustrating a display example in the display unit 107.

A home screen shown in FIG. 2 is normally displayed in the display unit 107. On the home screen, plural selection buttons (icons) 21 are displayed. As any one button of the selection buttons 21 is selected (pressed) by a user, a function corresponding to the selected selection button 21 is executed.

Specifically, in the example shown in FIG. 2, as the selection buttons 21, selection buttons 21 for selecting any one of "copy", "box storage", "ID card copy", "media access", "mail", "print", "PC storage" and "fax" are displayed. Further, in the exemplary embodiment, if the user selects any one of these selection buttons 21, a screen for performing detailed setting is then displayed. Then, if a predetermined button such as a start button is pressed by the user, a process such as copy is started.

The home screen of the exemplary embodiment is configured by plural pages, and is switched to another page by drawing a "ground" portion (background portion) on the display screen shown in FIG. 2 in a left direction in the figure while pressing the "ground" portion with a finger. Additionally, in the exemplary embodiment, the page switching is performed by a so-called flick operation. If the page switching is performed, different selection buttons 21 appear.

Further, in the display unit 107 of the exemplary embodiment, each of the selection buttons 21 is movable according to an operation. Specifically, by moving a finger in a state where the selection button 21 is pressed by the finger, it is possible to move the selection button 21. In other words, in the exemplary embodiment, the movement of the selection button 21 is performed by drag-and-drop.

Further, in the exemplary embodiment, if the selection button 21 is continuously pressed for a predetermined time, or if a gear-shaped symbol (symbol indicated by reference numeral 2A) positioned in an upper right part of the screen is pressed in a state where any one of the selection buttons 21 is selected, the screen is switched, so that detailed setting of functions associated with the selected selection button 21 may be performed.

Figure 3:
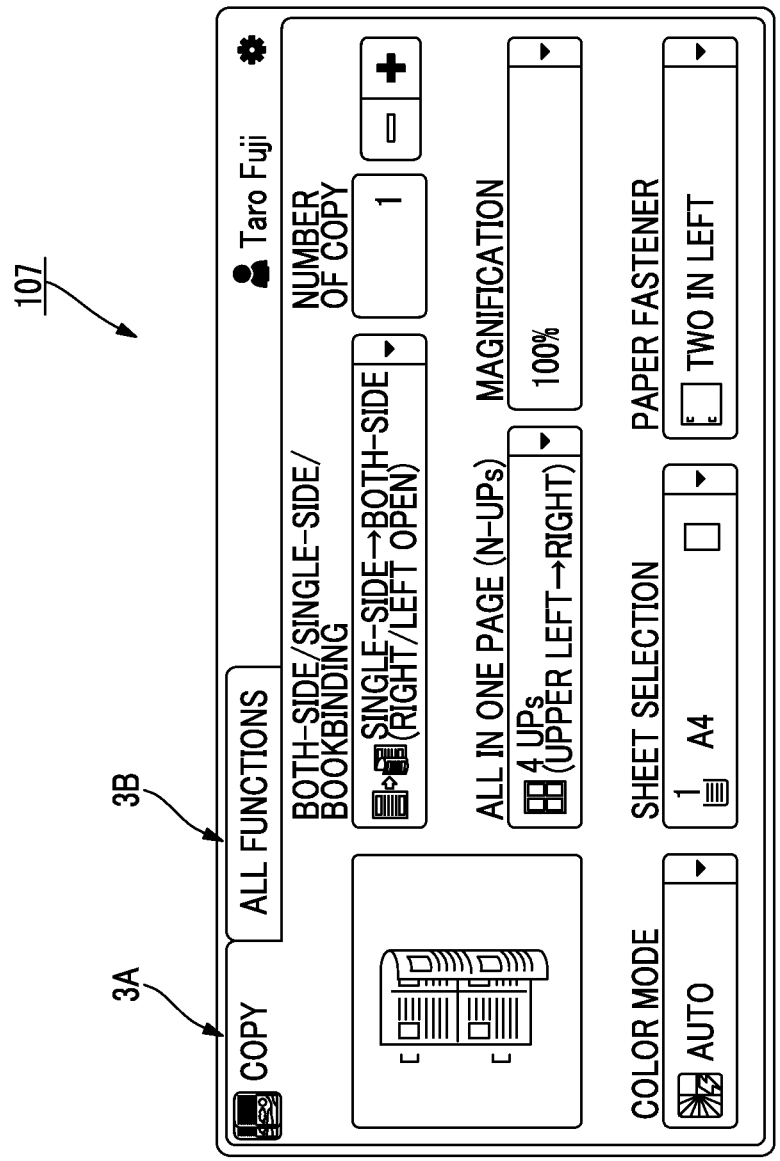
FIG. 3 is a diagram illustrating a display screen after a "copy" selection button shown in FIG. 2 is selected by a user.

FIG. 3 is a diagram illustrating a display screen after the "copy" selection button 21 shown in FIG. 2 is selected (pressed) by a user.

On this display screen, two tabs (hereinafter, referred to as a "first tab 3A" and a "second tab 3B") are provided as indicated by reference numerals 3A and 3B. If only two tabs are present in this way, a button (button to be operated) necessary for a user is present in any one tab. Then, if the tab is moved once, the necessarily necessary buttons are present, and thus, it is possible to reduce the number of times of the movement of the tab until the user selects a tab in which a necessary button (button to be operated) is present, compared with a case where there are three or more tabs, for example, four, five or the like.

In other words, if there are many tabs, it is difficult to recognize a matching relationship between the tabs and their functions. However, as in the exemplary embodiment, if only two tabs are present, it is easy to recognize the matching relationship between the tabs and their functions.

Here, in a state where the first tab 3A is selected, as shown in FIG. 3, setting items such as "both-side/single-side/bookbinding", "the number of copies", "the number of N-ups (the number of pages integrated in one page)", "magnification", "color mode", "sheet selection" and "paper fastener" are displayed. In other words, in the exemplary embodiment, on the display screen when the first tab 3A is selected, setting items considered to have a relatively high frequency of change by the user are displayed.

Figure 4:
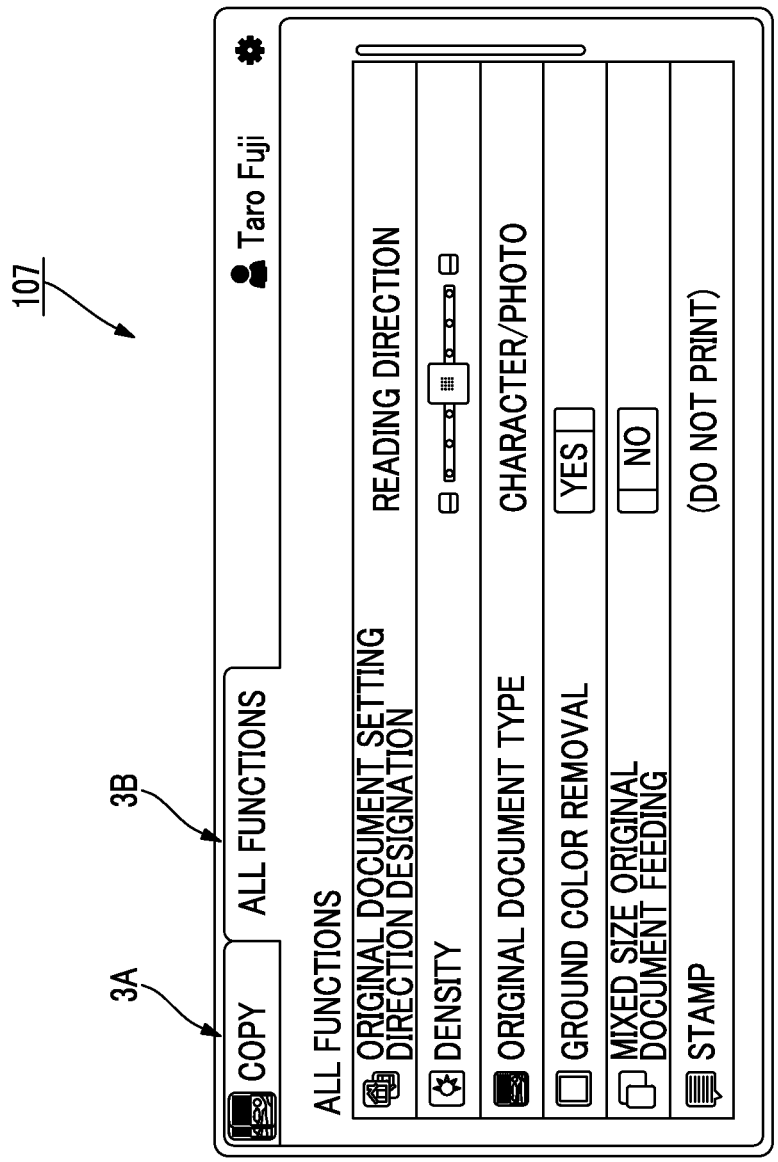
FIG. 4 is a diagram illustrating a display example in the display unit.

On the other hand, in the exemplary embodiment, with respect to setting items considered to have a relatively low frequency of change by the user, as shown in FIG. 4 (illustrating a display example in the display unit 107), the display is performed by a display screen when the second tab 3B is selected.

Here, on the display screen shown in FIG. 4, the respective setting items (respective items that are to be set by the user) are arranged in a longitudinal direction of the screen to be displayed. In other words, the setting items are displayed in a list form. On the display screen shown in FIG. 4, hidden setting items are also displayed by performing scroll downward in the figure.

Here, on the display screen when the second tab 3B is selected, other setting items are also displayed by performing scroll in one direction (downward in the figure). Thus, the user may easily find a setting item that the user is looking for.

Here, for example, it may be considered that the respective setting items are displayed in a button form and are arranged in a lattice form. In this case, the user should move the user's sight line in a longitudinal direction and in a transverse direction as necessary. In this case, it is difficult for the user to find the setting item that the user is looking for, compared with the case where the setting items are displayed by performing scroll in one direction as in the exemplary embodiment.

Figure 5:
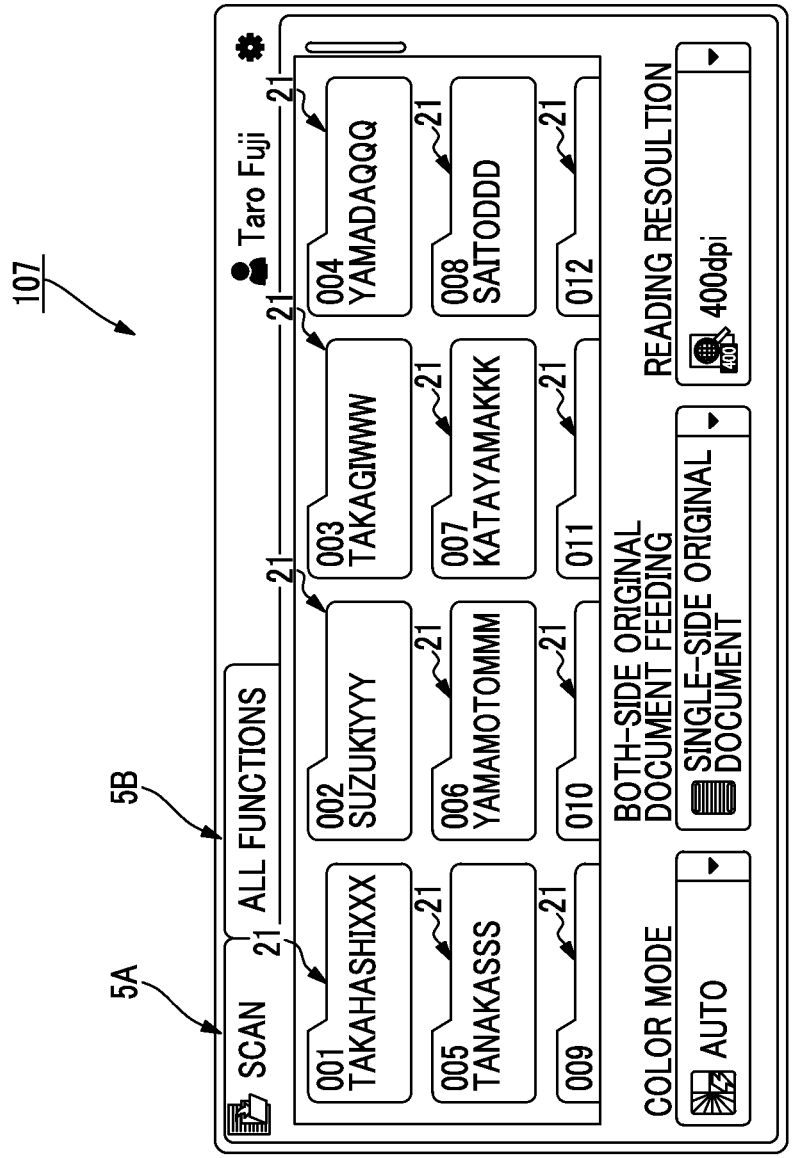
FIG. 5 is a diagram illustrating a display screen when "box storage" on a home screen shown in FIG. 2 is selected.

FIG. 5 is a diagram illustrating a display screen when the "box storage" on the home screen shown in FIG. 2 is selected.

If the "box storage" on the home screen is selected, as shown in FIG. 5, the screen is switched to a display screen in which plural selection buttons 21 that are given user names are displayed. On this display screen, similarly to the previous display screen, two tabs (hereinafter, referred to as a "first tab 5A" and a "second tab 5B") are provided.

FIG. 5 shows a state where the first tab 5A is selected. Further, in the exemplary embodiment, if the "box storage" is selected and the display screen is switched, first, the first tab 5A is displayed. Further, in the exemplary embodiment, as the user separately selects the second tab 5B, a display screen corresponding to the second tab 5B is displayed.

Here, the box storage refers to a process of storing the image data generated by reading the original document using the image reading unit 108 (see FIG. 1) in the storage unit 105. Here, if any one of the selection buttons 21 shown in FIG. 5 is selected by the user, a storage destination is designated, and the image data is stored in the storage destination.

Until the storage destination is selected, all the respective selection buttons 21 shown in FIG. 5 enter an off state (of approximately the same color as the color of "ground"), and if the storage destination is selected, the buttons are switched to a different color to enter an on state (selected state).

Further, on the display screen shown in FIG. 5, setting items ("color mode", "original document feeding mode" and "reading resolution") having a high change frequency from the user are displayed at the lowermost part of the screen. With respect to the setting items, the content thereof may be changed without performing screen switching (without selecting the second tab 5B).

(A) and (B) of FIG. 6 are diagrams illustrating display screens when the second tab 5B is selected.

As shown in (A) of FIG. 6, when the second tab 5B is selected, other setting items capable of being set in the box storage are displayed. In this case, the respective setting items may be displayed in a list form, similarly to the above description. Here, in the exemplary embodiment, a file name is given to each original document that is read by the image reading unit 108. Further, in the exemplary embodiment, if the setting item of "filename" shown in (A) of FIG. 6 is selected, a file name input display screen is displayed as shown in (B) of FIG. 6. In the exemplary embodiment, the user inputs a desired file name through the display screen.

Next, personal printing will be described.

In the personal printing, image data generated by a personal computer (PC) or the like of a user is transmitted to the image forming apparatus 10, and is temporarily stored in the storage unit 105 (see FIG. 1) of the image forming apparatus 10. Further, as the user inputs a start instruction through the display unit 107, image formation onto the sheet is started.

In the personal printing, since the image formation is performed in a state where the user is present in the vicinity of the image forming apparatus 10, the user may obtain a printed matter immediately after the printed matter is output. In this case, it is difficult for a person other than the user to obtain the printed matter.

Here, when the personal printing is performed, the home screen shown in FIG. 2 is operated, and a "personal printing" selection button (not shown in FIG. 2) is selected by the user. Then, if the "personal printing" selection button is selected, the screen is switched to a display screen shown in FIG. 7 (that is a diagram showing a display screen after the "personal printing" is selected).

Here, on the display screen after switching shown in FIG. 7, file names of plural pieces of image data (printing jobs) stored in the storage unit 105 are displayed in a list form. In other words, the respective file names are displayed in a state of being arranged in the longitudinal direction. Further, on a left side of the file name in the figure, a preview screen indicating a state of a sheet after printing is displayed.

Here, if one of the plural files shown in FIG. 7 is selected, the screen is switched to a screen shown in FIG. 8 (that is a diagram showing a display screen after the file is selected). Here, on this display screen, setting items are displayed at a lower half part of the screen. Specifically, in this example, three setting items of "the number of copies", "color mode" and "both-side printing" are displayed.

Further, the file name is displayed at an upper right part of the display screen, and the preview screen indicating the state of the sheet after printing is displayed at an upper left part of the display screen. In the exemplary embodiment, each of the three setting items may be changed on the display screen shown in FIG. 8. If any setting item is changed, the preview screen is also changed according to the change. That is, in the exemplary embodiment, the preview screen is dynamically changed according to the change of the setting item.

Here, in the exemplary embodiment, as described above, the files are displayed in the list form in this way, and then, the user selects a desired file to be printed. Then, the selected file is printed.

Although not shown, in the exemplary embodiment, a "personal batch printing" selection button 21 is also prepared on the home screen, and if this selection button 21 is pressed, accumulated documents that are not yet output are printed in a batch by one-touch (without performing a different input operation). In other words, in the exemplary embodiment, two types of selection buttons 21 of "personal printing (list display)" and "personal batch printing" are prepared with respect to the personal printing.

However, in the image forming apparatus 10 of the exemplary embodiment, in addition to the selection buttons 21 that are prepared in advance, a new selection button 21 may be created by the user. In other words, in the exemplary embodiment, it is possible to create the selection button 21 (hereinafter, referred to as a "one-touch selection button 21") through which the process is started by performing selection of the selection button 21 once (by performing the input operation once instead of performing the input operation plural times). The "personal batch printing" selection button 21 corresponds to the one-touch selection button 21.

Here, when the user creates the one-touch selection button 21, a gear-shaped symbol (symbol indicated by reference numeral 9A) positioned at an upper right part in (A) of FIG. 9 (that is a diagram illustrating a display screen when the user creates the one-touch selection button 21) is pressed by the user. The display screen shown in (A) of FIG. 9 displays a screen in mail transmission. In other words, (A) of FIG. 9 shows a state after the "mail" selection button 21 shown in FIG. 2 is selected so that the display screen is switched.

Here, if the gear-shaped symbol is pressed, a display screen shown in (B) of FIG. 9 is displayed. Here, on this display screen, information necessary for the creation of the one-touch selection button 21 is input by the user. Specifically, a name (first row) and a name (second row) are input by the user. Here, in the one-touch selection button 21 (one-touch selection button 21 after creation) of the exemplary embodiment, the names are displayed in two stages. The "name (first row)" represents a name displayed in the upper stage among two stages, and the "name (second row)" represents a name displayed in the lower stage among two stages.

Further, on the display screen shown in (B) of FIG. 9, a button (see reference numeral 9B) to be pressed by the user when changing a symbol of the one-touch selection button 21 (icon) is also displayed. If this button is pressed by the user, a screen shown in FIG. 10 (that is a diagram illustrating a list of the one-touch selection buttons 21) is displayed. Here, if the user selects one one-touch selection button 21 from the screen, the selected one one-touch selection button 21 is registered as a new one-touch selection button 21. Further, in the exemplary embodiment, the user may register an explanation. When registration of the explanation is desired, the user inputs the explanation in a box positioned at a lower part of the display screen (display screen shown in (B) of FIG. 9).

Here, if the user's input for the display screen shown in (B) of FIG. 9 is finished, the user presses a "create" button positioned at an upper right part in the figure. Thus, the display is switched into a display screen shown in (C) of FIG. 9, and a "one-touch mail transmission" one-touch selection button 21 is added on the display screen (on the home screen).

Hereinbefore, the process of creating the one-touch selection button 21 is described. However, in the exemplary embodiment, the user may create the selection button 21 for displaying a confirmation screen after selecting the selection button 21 and for executing the process by inputting a start button. The one-touch selection button 21 and the normal selection button 21 are formed to be distinguished from each other on the display screen. As indicated by reference numeral 9E in (C) of FIG. 9, a diamond-shaped mark is added to the one-touch selection button 21. In the exemplary embodiment, the start button for executing the process after the confirmation screen is displayed is disposed in a different place (not shown) of the image forming apparatus, instead of the display screen.

In the above description, the display process in the image forming apparatus 10 is described, but the display process may be similarly performed in a device (device such as a tablet terminal, for example) other than the image forming apparatus 10.

Hereinafter, the personal printing will be described in detail.

In the personal printing, the image data generated by the PC or the like by the user is transmitted to the image forming apparatus 10, and is temporarily stored in the storage unit 105 (see FIG. 1) that is an example of a storage unit. Further, in the exemplary embodiment, identification information for identifying the user who generates the image data is associated with all image data stored in the storage unit 105, and the image data and the identification information are stored in the storage unit 105 in association. Further, the user moves close to the image forming apparatus 10, and for example, holds up a security card or inputs a password, so that user authentication is performed. Thus, the identification information is obtained by the image forming apparatus 10, and then, the personal printing is performed using the identification information (details thereof will be described later).

Next, respective processes when the "personal printing (list display)" selection button 21 and the "personal batch printing" selection button 21 displayed on the display screen under the control of the control unit 100 that is an example of a display section are selected by the user will be described.

When the "personal printing (list display)" selection button 21 that is an example of a second operating portion is selected by the user, the control unit 100 obtains file names of all of the image data associated with the identification information of the user among the image data stored in the storage unit 105. Further, as shown in FIG. 7, the control unit 100 displays the obtained file names on the display screen in a list form. Here, if the user selects one or plural file names from the list, the control unit 100 obtains the image data corresponding to the one or plural selected file names from the storage unit 105. Further, the printing is performed by the image forming unit 109 that is an example of an image forming section based on the obtained image data.

Further, when the user selects the button of "select all" on the display screen shown in FIG. 7 (select all), the control unit 100 obtains image data corresponding to all the file names of the list from the storage unit 105. Further, the printing is performed based on the obtained image data. When the user selects the "select all", the printing is performed for the entire image data, regardless of whether the image data has been printed or not. Further, after the printing is finished based on the "personal printing (list display)", the control unit 100 gives a flag (hereinafter, referred to as a print flag) for recording the fact that the printing is finished to the image data of which the printing is finished.

On the other hand, when the "personal batch printing" selection button 21 that is an example of a first operating portion is selected by the user, the control unit 100 extracts image data associated with the identification information of the user from among the image data stored in the storage unit 105. Further, the control unit 100 obtains all image data that has never been printed from among the extracted image data. Here, a print flag is given to image data that has been printed once or more among the image data stored in the storage unit 105. Thus, the control unit 100 confirms the presence or absence of the print flag to obtain the image data that has never been printed. Then, the printing is performed based on the obtained image data. Further, in the "personal batch printing", after the printing, the printed image data is deleted from the storage unit 105 by the control unit 100 that is an example of a deleting section, different from the "personal printing (list display)".

If the "personal batch printing" selection button 21 is selected in this way, non-output accumulated documents that have never been printed are printed in a batch by one-touch. However, when the printing is performed by the "personal batch printing", after the printing, the printed image data is deleted. Thus, the print flag is not given to the image data printed by the "personal batch printing".

Next, the display of the selection button 21 used in the personal printing will be described.

In the personal printing, two types of selection buttons 21 of the "personal batch printing" and the "personal printing (list display)" are displayed on the home screen.

FIGS. 11A and 11B are diagrams illustrating the selection buttons 21 used in the personal printing. A button shown in FIG. 11A corresponds to the "personal batch printing" selection button 21, and a button shown in FIG. 11B corresponds to the "personal printing (list display)" selection button 21.

As shown in FIGS. 11A and 11B, in the exemplary embodiment, a symbol of the image forming apparatus is given to the "personal batch printing" selection button 21 and the "personal printing (list display)" selection button 21 as a common image. Thus, it is easy for the user to recognize that the process relating to image formation is performed by the two selection buttons 21. Further, as shown in FIG. 11A, in the "personal batch printing" selection button 21, a diamond-shaped mark that is an example of another image indicating the one-touch selection button 21 is added to the symbol of the image forming apparatus. Thus, it is easy for the user to recognize by the diamond-shaped mark that the process that is partially different is performed between the "personal batch printing" selection button 21 and the "personal printing (list display)" selection button 21.

Next, a procedure when the user performs printing by the personal printing will be described.

FIG. 12 is a flowchart illustrating an example of a printing procedure based on the personal printing. In the flow in FIG. 12, as an initial state, it is assumed that plural pieces of image data generated by the PC by the user are transmitted to the image forming apparatus 10 and are stored in the storage unit 105.

First, the user selects whether to print plural documents in a batch (step 101). If the printing is not performed in a batch (No in step 101), the user may select the "personal printing (list display)" selection button 21. If the "personal printing (list display)" selection button 21 is selected, file names of image data associated with identification information of the user are displayed in a list form. Further, the user selects one file name to be printed, and thus, the printing of the selected document is performed (step 102).

On the other hand, if the printing is performed in a batch (Yes in step 101), the user selects whether to print only documents that have never been printed in a batch (step 103). Here, if only the documents that have never been printed are printed in a batch (Yes in step 103), the user may select the "personal batch printing" selection button 21. If the "personal batch printing" selection button 21 is selected, the documents that have never been printed are printed in a batch without a different input operation of the user (step 104).

Further, if documents including the documents that have been printed once or more are printed in a batch (No in step 103), the user selects whether to collectively print the documents that have been printed once or more and the documents that have never been printed (step 105). If the collective printing is performed (Yes in step 105), the user may select the "personal printing (list display)" selection button 21, and then, may select all the file names that are list-displayed. If all the file names are selected by the "personal printing (list display)", all of the documents that have been printed once or more and the documents that have never been printed are printed (step 106).

On the other hand, if the user prints in a batch any one of the documents that have been printed once or more and the documents that have never been printed (No in step 105), the user may select the "personal printing (list display)" selection button 21. Further, the user may select file names to be printed in a batch among the documents that have been printed once or more and the documents that have never been printed, from the displayed list of the file names. If the file names of the list are selected, the printing of the selected documents is performed (step 107).

As described above, the personal printing includes the two types of selection buttons 21 of the "personal batch printing" and "personal printing (list display)". Further, when the user selects the "personal batch printing" selection button 21, the non-output accumulated documents that have never been printed are printed in a batch without a different input operation. Further, after the printing, the printed image data is deleted.

On the other hand, when the user selects the "personal printing (list display)" selection button 21, the file names of the documents that have been printed once or more and the documents that have never been printed are displayed in a list form. Further, as the user selects the file name on the display screen, the selected document is printed. Here, the printed image data is not deleted, and remains stored in the storage unit 105.

In this way, since the two types of selection buttons 21 of the "personal batch printing" and the "personal printing (list display)" are prepared, the user may use the "personal printing (list display)" when selecting a document to be printed. Further, the user may use the "personal batch printing" when printing only the non-output accumulated documents in a batch, and thus, for example, it is possible to reduce the burden of the user, compared with a configuration in which the user selects file names to perform printing.

Further, for example, with respect to documents to be printed only once, if the user uses the "personal batch printing", since image data after printing is deleted, and thus, exhaustion of the storage capacity of the storage unit 105 is suppressed, so that the storage capacity is effectively used.

Further, for example, for the document to be printed again, if the user uses the "personal printing (list display)", since image data after printing is stored as it is, the user selects the same file name on the display screen so that the selected document may be printed again.

In this way, the user may determine which selection button 21 for the personal printing is to be selected according to the document to be printed, and thus, convenience in printing is improved.

Further, in the exemplary embodiment, the image data is transmitted to the image forming apparatus 10 to be stored in the storage unit 105, but the invention is not limited this configuration. For example, the image data may be transmitted to an external device connected to the image forming apparatus 10 to be stored in a storage unit provided in the external device.

Further, in the exemplary embodiment, if the "personal printing (list display)" is selected by the user, as shown in FIG. 7, the file names of all the image data associated with the identification information of the user among the image data stored in the storage unit 105 are displayed, but for example, the documents that have been printed once or more and the documents that have never been printed may be separately displayed.

In this case, for example, instead of or in addition to the tab of "printing from stored documents" on the display screen shown in FIG. 7, two tabs of "printing from history" and "printing from non-output documents" may set. With such a configuration, if the user selects the tab of "printing from history", file names of documents that have been printed once or more, among the image data associated with the identification information of the user, in the image data stored in the storage unit 105 are displayed in a list form. Further, if the user selects the tab of "printing from non-output documents", file names of documents that have never been printed, among the image data associated with the identification information of the user, in the image data stored in the storage unit 105 are displayed in a list form. Further, the user may select a file name to be printed from the displayed list of the file names.

Further, if the user selects the tab of "printing from history" and selects a button of "select all" on the display screen, documents that have been printed once or more are selected in a batch to be collectively printed. Further, if the user selects the tab of "printing from non-output documents" and selects a button of "select all" on the display screen, documents that have never been printed are selected in a batch to be collectively printed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a display section configured to display, on a display screen, a first operating portion through which a first operation instruction of an operator is input and a second operating portion through which a second operation instruction different from the first operation instruction is input; and
   an image forming section configured to perform image formation onto a recording medium for a batch of a plurality of pieces of image data in which the image formation has not been executed among image data stored in a storage unit in response to the first operation instruction of the operator being input through the first operating portion displayed by the display section, and to display the image data stored in the storage unit as a list and perform the image formation onto the recording medium for image data selected from the list by the operator in response to the second operation instruction of the operator being input through the second operating portion displayed by the display section,
   wherein the first operating portion and the second operating portion displayed by the display section respectively include a common image that is common to both of the first operating portion and the second operating portion, and
   one of the first operating portion and the second operating portion additionally includes a separate image other than the common image.

2. The image forming apparatus according to claim 1,
   wherein the display section is configured to display a third operating portion that displays the image data stored in the storage unit as a list where the plurality of pieces of the image data are selectable in response to the second operation instruction of the operator being input through the second operating portion displayed by the display section.

3. The image forming apparatus according to claim 2, wherein the third operating portion is configured to select a batch of the plurality of pieces of image data in which the image formation has been executed.

4. The image forming apparatus according to claim 2, wherein the third operating portion is configured to select a batch of both of the plurality of pieces of image data in which the image formation has been executed and the image data in which the image formation has not been executed.

5. The image forming apparatus according to claim 1, further comprising:
a deleting section configured to delete the image data from the storage unit after the first operation instruction of the operator is input through the first operating portion and the image formation onto the recording medium is performed based on the image data in which the image formation has not been executed.

6. The image forming apparatus according to claim 1, wherein the image data selected by the operator is not deleted and is maintained in a state of being stored in the storage unit after the image formation is performed by the image forming section in response to the second operation instruction of the operator being input through the second operating portion.

7. An image forming system comprising:
a storage unit configured to store input image data;
a display section configured to display, on a display screen, a first operating portion through which a first operation instruction of an operator is input and a second operating portion through which a second operation instruction different from the first operation instruction is input; and
an image forming section configured to perform image formation onto a recording medium for a batch of a plurality of pieces of image data in which the image formation has not been executed among image data stored in the storage unit in response to the first operation instruction of the operator being input through the first operating portion displayed by the display section, and to display the image data stored in the storage unit as a list and perform image formation onto the recording medium for image data selected from the list by the operator in response to the second operation instruction of the operator being input through the second operating portion displayed by the display section,
wherein the first operating portion and the second operating portion displayed by the display section respectively include a common image that is common to both of the first operating portion and the second operating portion, and
one of the first operating portion and the second operating portion additionally includes a separate image other than the common image.

8. A non-transitory computer readable recording medium storing a program that causes a computer to execute a process, the process comprising:

displaying, on a display screen, a first operating portion through which a first operation instruction of an operator is input and a second operating portion through which a second operation instruction different from the first operation instruction is input; and
causing an image forming section to perform the image formation onto a recording medium for a batch of a plurality of pieces of image data in which the image formation has not been executed among image data stored in the storage unit in response to the first operation instruction of the operator being input through the displayed first operating portion, and to display the image data stored in the storage unit as a list and perform the image formation onto the recording medium for image data selected from the list by the operator in response to the second operation instruction of the operator being input through the second operating portion displayed by the display section,
wherein the first operating portion and the second operating portion displayed by the display section respectively include a common image that is common to both of the first operating portion and the second operating portion, and
one of the first operating portion and the second operating portion additionally includes a separate image other than the common image.

9. An image forming method comprising:
displaying, on a display screen, a first operating portion through which a first operation instruction of an operator is input and a second operating portion through which a second operation instruction different from the first operation instruction is input; and
causing an image forming section to perform the image formation onto a recording medium for a batch of a plurality of pieces of image data in which the image formation has not been executed among image data stored in the storage unit in response to the first operation instruction of the operator being input through the displayed first operating portion, and to display the image data stored in the storage unit as a list and perform the image formation onto the recording medium for image data selected from the list by the operator in response to the second operation instruction of the operator being input through the second operating portion displayed by the display section,
wherein the first operating portion and the second operating portion displayed by the display section respectively include a common image that is common to both of the first operating portion and the second operating portion, and
one of the first operating portion and the second operating portion additionally includes a separate image other than the common image.

* * * * *